(12) United States Patent
Stockman et al.

(10) Patent No.: US 12,215,665 B2
(45) Date of Patent: Feb. 4, 2025

(54) ASSEMBLY FOR TRANSFERRING WAVE ENERGY TO AN ENERGY CONVERTER

(71) Applicant: Marine Power Systems Limited, Swansea (GB)

(72) Inventors: Gareth Ian Stockman, Swansea (GB); John Christopher Chapman, Swansea (GB); Graham Foster, Swansea (GB)

(*) Notice: Subject to any disclaimer, the term of this patent is extended or adjusted under 35 U.S.C. 154(b) by 24 days.

(21) Appl. No.: 16/637,353

(22) PCT Filed: Aug. 9, 2018

(86) PCT No.: PCT/GB2018/052274
§ 371 (c)(1),
(2) Date: Feb. 7, 2020

(87) PCT Pub. No.: WO2019/030534
PCT Pub. Date: Feb. 14, 2019

(65) Prior Publication Data
US 2021/0372361 A1   Dec. 2, 2021

(30) Foreign Application Priority Data

Aug. 10, 2017  (GB) ...................... 1712855

(51) Int. Cl.
*F03B 13/18* (2006.01)
(52) U.S. Cl.
CPC ...... *F03B 13/1865* (2013.01); *F05B 2240/40* (2013.01); *F05B 2260/406* (2013.01); *F05B 2270/202* (2020.08)
(58) Field of Classification Search
CPC .. F03B 13/1865; F03B 13/20; F03B 13/1885; F05B 2240/40; F05B 2260/406; F05B 2270/202; F05B 2270/20; Y02E 10/30
See application file for complete search history.

(56) References Cited

U.S. PATENT DOCUMENTS

| 7,443,046 B2* | 10/2008 | Stewart | .................. | F03B 13/20 |
| | | | | 290/53 |
| 2009/0081055 A1* | 3/2009 | Windle | .................. | F04B 17/00 |
| | | | | 417/333 |

(Continued)

FOREIGN PATENT DOCUMENTS

| EP | 1691072 | 8/2006 |
| EP | 2128430 A1 | 12/2009 |

(Continued)

OTHER PUBLICATIONS

Rao, Pothineni Srinivasa, "Indian 1st Examination Report", 9 Pages.

(Continued)

*Primary Examiner* — Tulsidas C Patel
*Assistant Examiner* — S. Mikailoff
(74) *Attorney, Agent, or Firm* — Blanchard Horton PLLC

(57) ABSTRACT

A drive assembly is provided suitable for aiding in the conversion of wave energy to useful energy. The drive assembly of the present invention is arranged to transfer wave energy to an energy converter, the drive assembly comprising, an actuating member having an actuating length. The drive assembly further comprises a movable energy transfer member arranged to be coupled to an energy converter and arranged to transfer energy from the actuating member to said energy converter. The drive assembly further comprises an energy storing member comprising a biasing member coupled to one or more of: the actuating member, the energy transfer member; the energy storing member being arranged to cause the actuating member or the energy transfer member to move position. The actuating member is arranged to move the energy transfer member from a first stroke position to a second stroke position; and the first stroke position and the second stroke position define distal (Continued)

end points of a working stroke; the working stroke arranged so as to drive said energy converter.

9 Claims, 7 Drawing Sheets

(56) References Cited

U.S. PATENT DOCUMENTS

| | | |
|---|---|---|
| 2011/0012358 A1 | 2/2011 | Brewster et al. |
| 2014/0007567 A1* | 1/2014 | Stewart ................... F16H 21/44 |
| | | 60/495 |
| 2015/0000263 A1* | 1/2015 | Foster ................. F03B 13/1885 |
| | | 60/504 |
| 2021/0372361 A1* | 12/2021 | Stockman ............... F03B 13/20 |

FOREIGN PATENT DOCUMENTS

| | | |
|---|---|---|
| EP | 2860423 | 4/2015 |
| JP | 2014532839 A | 5/2017 |
| KR | 101389488 | 4/2014 |
| KR | 20140097325 A | 8/2014 |
| WO | WO2010/007418 | 1/2010 |
| WO | WO2011/158006 | 12/2011 |
| WO | WO2013/068748 | 5/2013 |

OTHER PUBLICATIONS

Xuan, Chang , "Chinese Office Actopn", 7 Pages.
Takayoshi, Norihisa , "Japanese Office Action", 5 pages.

* cited by examiner

ASSEMBLY FOR TRANSFERRING WAVE ENERGY TO AN ENERGY CONVERTER

FIELD OF THE INVENTION

The present invention relates to a drive assembly, in particular a drive assembly for use in transferring wave energy to an energy converter.

BACKGROUND TO THE INVENTION

In recent years, there has been increased emphasis on the need to exploit renewable energy so that it significantly contributes to global energy production. A combination of government targets, media representation of the issues associated with non-renewable energy sources, and ever increasing energy costs have all created a powerful driving force for the development of renewable energy systems.

Negative impacts of fossil fuels on the environment are well known, as are the problems and high costs associated with nuclear energy. Harnessing of the huge natural abundance of renewable energy on the other hand is constrained merely by our capability of capturing and supplying it at an economically viable price.

One potential renewable energy source is wave power—an abundant and consistent energy resource available in all of the world's large oceans and seas. Various wave devices for generating energy from wave power have been proposed, but such devices have many limitations with no one device having the proven ability to reliably exploit the available wave power resource over the long term.

There are disclosed in WO2010007418, WO2011158006 and WO2013068748 successively improved generators for converting wave motion to useful energy. The generators disclosed use a submersible reaction body to solve many of the difficulties associated with existing wave energy converters.

However, the wave energy converters disclosed in WO2010007418, WO2011158006 and WO2013068748 still have potential for further improvement.

SUMMARY OF THE INVENTION

In accordance with the invention, a drive assembly is provided as outlined in the accompanying claims.

In accordance with a first aspect of the present invention, there is provided a drive assembly arranged to transfer wave energy to an energy converter, the drive assembly comprising, an actuating member having an actuating length; a movable energy transfer member arranged to be coupled to an energy converter and arranged to transfer energy from the actuating member to said energy converter; an energy storing member comprising a biasing member coupled to one or more of: the actuating member, the energy transfer member; the energy storing member being arranged to cause the actuating member or the energy transfer member to move position; wherein the actuating member is arranged to move the energy transfer member from a first stroke position to a second stroke position; and wherein the first stroke position and the second stroke position define distal end points of a working stroke; the working stroke arranged so as to drive said energy converter. The actuating member preferably comprises a flexible rope.

The drive assembly is preferably arranged to be used within a wave powered generator and preferably aids in the optimum conversion of wave energy to useful energy.

The drive assembly of the present invention is preferably arranged to provide energy from a source to an energy converter by way of an energy transfer member and an energy storing member having a biasing member. The actuating member actuates the drive assembly by moving the energy transfer member from a first stroke position to a second stroke position, defining distal end points of a working stroke, the working stroke being using to drive a said energy converter. The movement of the energy transfer member by the actuating member also preferably causes the movement of the energy storing member comprising a biasing member. Upon reaching the second stroke position, the energy transfer member is biased toward the first stroke position by the biasing member. Movement of the energy transfer member to the first stroke position from the second stroke position by the biasing member constitutes a further working stroke and acts to further drive a said energy converter. The reciprocal movement of the energy transfer member from the first stroke position to the second stroke position in this manner causes the continued driving of a said energy converter.

Preferably the drive assembly further comprises an energy capturing member coupled to the actuating member and is enabled to transfer wave energy to the actuating member. In preferable embodiments comprising an energy capturing member, the actuating length of the actuating member defines a distance between the energy capturing member and the energy transfer member. The energy capturing member preferably comprises a buoyant portion.

Energy is preferably provided to the actuating member by means of an energy capturing member arranged to capture energy, wherein the movement of the energy capturing member causes the movement of the actuating member, which subsequently drives the drive assembly as described above.

In most preferable embodiments, the drive assembly of the present invention is used in capturing wave power, and in said embodiments, the energy capturing member preferably comprises a wave-energy capturing float. In such embodiments, the energy capturing member is preferably enabled to move in a reciprocal motion according to the movement of waves, thereby permitting the transfer of energy to a said energy converter by moving the actuating member.

The drive assembly preferably further comprises an adjustment member for adjusting the actuating length of the actuating member. In embodiments comprising an energy capturing member, the adjustment member is preferably positioned between the energy transfer member and the energy capturing member. The adjustment of the actuating length by the adjustment member is preferably independent of the working stroke. The actuating length of the actuating member can preferably be adjusted by the adjustment member simultaneous to the operation of the working stroke. In certain preferable embodiments, the drive assembly comprises two or more actuating members, and wherein the actuating lengths of the two or more actuating members can be adjusted by the adjustment member independently. In embodiments comprising an adjustment member, the adjustment member preferably comprises a winch arranged to store a portion of the actuating member.

Adjustment of the actuating length of the actuating member by the adjustment member preferably enables the optimisation of the drive assembly of the present invention to suit conditions for capturing energy and driving a said energy converter. In embodiments wherein the drive assembly of the present invention is used to capture wave energy using an energy capturing member having a floating portion, the actuating length of the actuating member can preferably be adjusted by the adjustment member in order to suit a variety of sea conditions.

The drive assembly is preferably arranged to be mounted onto a reaction member, said reaction member being arranged to provide a platform for the drive assembly. In embodiments wherein the drive assembly is arranged to be mounted onto a reaction member, the energy storing member and said energy converter are preferably mounted between said reaction member and the energy transfer member.

In most preferable embodiments the drive assembly of the present invention is mounted onto a reaction member serving as a platform for the drive assembly, and can optionally have additional functionality contributing to the functioning of the drive assembly. For instance, in certain embodiments the reaction member may optionally comprise a floating portion providing a floating platform for the drive assembly. In the most preferable embodiments, wherein the drive assembly is used to capture wave energy, the floating reaction member may optionally be suspended at a predetermined distance from the seabed using mooring lines. The use of a floating portion on a said reaction member in this way could provide stability to the drive assembly when used for the purpose of capturing wave energy.

The energy storing member preferably comprises at least one selected from the range: a spring; an actuator being mechanically or electrically biased; an elastic member; a compressible member; a magnetic member.

The energy storing member and/or the biasing member preferably comprise a spring in order to bias the energy transfer member to the first stroke position and as such enable the continued driving of a said energy converter. In certain embodiments the energy storing member and/or the biasing member also preferably defines a neutral position of the working stroke that is defined by the degree to which buoyancy force in the float impinges upon the energy storing member and/or the biasing member. (i.e. when there are no wave induced forces moving the energy capturing member). Therefore the working stroke can be positive or negative about the neutral position. Other embodiments will be conceivable wherein the energy storing member may comprise an energy storing material or device.

In certain embodiments, the energy transfer member preferably comprises a rotating portion arranged to rotate about an axis as a result of actuation by the actuating member. In certain embodiments, the energy transfer member preferably comprises a movable pulley arranged to move in a reciprocating motion along an orthogonal plane as a result of actuation by the actuating member, the extent of said reciprocating motion defining the working stroke.

In embodiments wherein the energy transfer member comprises a moveable pulley, the actuating member is responsible for moving the pulley on an orthogonal plane from a first stroke position to a second stroke position. The biasing member is preferably enabled to bias the pulley toward the second stroke position. Most preferably the pulley comprises a rotating portion around which the actuating member preferably extends.

The energy transfer member is preferably arranged to store a portion of the actuating member. The length of stored actuating member preferably changes as the energy transfer member moves through the working stroke, allowing the energy capturing member to move with the waves. In such embodiments the actuating portion is arranged to extend around or within the energy transfer member.

In embodiments wherein the energy transfer member comprises a moveable pully and the drive assembly comprises an adjustment member, the adjustment member preferably comprises a winch that positioned between the energy transfer member and the reaction member that terminates and provides storage for the actuating member by spooling a portion of the actuating member onto the winch. Thus, the energy generation function of the drive assembly is able to operate simultaneously with and yet independently of the function of adjusting the length of the actuating member.

In certain embodiments, the drive assembly preferably comprises a plurality of energy transfer members coupled to the actuating member, and wherein movement of the energy transfer members by the actuating member comprises rotation about an axis. In embodiments comprising a plurality of energy transfer members coupled to the actuating member, and wherein movement of the energy transfer members by the actuating member comprises rotation about an axis, rotation of the plurality of energy transfer members is preferably arranged to be adjusted, with rotation in specific embodiments being by way of a differential gear. In the specific embodiments wherein rotation of the energy transfer members is adjusted by a differential gear, the differential gear preferably comprises a first sun gear coupled to an energy transfer member, a second sun gear coupled to an energy transfer member, and a ring gear coupled to the first and second sun gears and arranged to be driven or locked by a motor.

In preferred embodiments, the energy transfer member takes the form of two drums enabled to provide spool storage for a portion of the actuating member. The two drums are preferably coupled together using a differential gear, permitting alternate rates of rotation of one of the drums with respect to the other, following movement induced by the actuating member. The spooling on and off of at least one of the drums by the actuating member preferably causes the rotation of the at least one drum, which in turn, through actuation of the differential gear, causes rotation of the other drum. Preferably the ring gear of the differential may be driven or locked by a drive gear coupled to a motor. The presence of the drive gear preferably permits the adjustment of the actuating length of the actuating member, independently of the working stroke, and thus the motor and the drive gear preferably act as an adjustment member.

In certain embodiments, the energy transfer member comprises a lever arm. In embodiments comprising an energy transfer member taking the form of a lever arm, the energy transfer member is preferably coupled to a reaction member at a hinge joint, forming a pivot point. In said embodiments, lever actuation constitutes pivoting of the lever arm about the pivot point, and is caused by movement of the energy transfer member by the actuating member. Pivoting of the energy transfer member about a pivot point in such embodiments is used to drive said energy converter.

In embodiments wherein the energy transfer member takes the form of a lever arm, adjustment of the length of the actuating member can preferably be provided by positioning an adjustment member on the leaver arm. More preferably, the adjustment member is a winch mounted on the lever arm which terminates the actuating member and provides storage for the actuating member by spooling a portion of the actuating member onto the winch.

Movement of the energy transfer member preferably includes at least one selected from the range:
  rotating about an axis;
  reciprocating orthogonal movement along an axis;

pivoting about a pivot point;
extension as a result of movement of the actuating member.

In embodiments wherein the energy transfer member comprises a pulley, movement of the energy transfer member by the actuating member preferably includes reciprocating orthogonal movement along an axis. In embodiments wherein the energy transfer member comprises one or more drums, the movement of the energy transfer member by the actuating member preferably includes rotating about an axis. In embodiments wherein the energy transfer member comprises a lever arm, the movement of the energy transfer member by the actuating member preferably includes extension as a result of movement of the actuating member and/or pivoting about a pivot point.

Said energy converter preferably comprises one selected from the range: a rotational generator; a linear generator; a hydraulic pump.

DETAILED DESCRIPTION

Specific embodiments will now be described by way of example only, and with reference to the accompanying drawings, in which.

Figure 1:
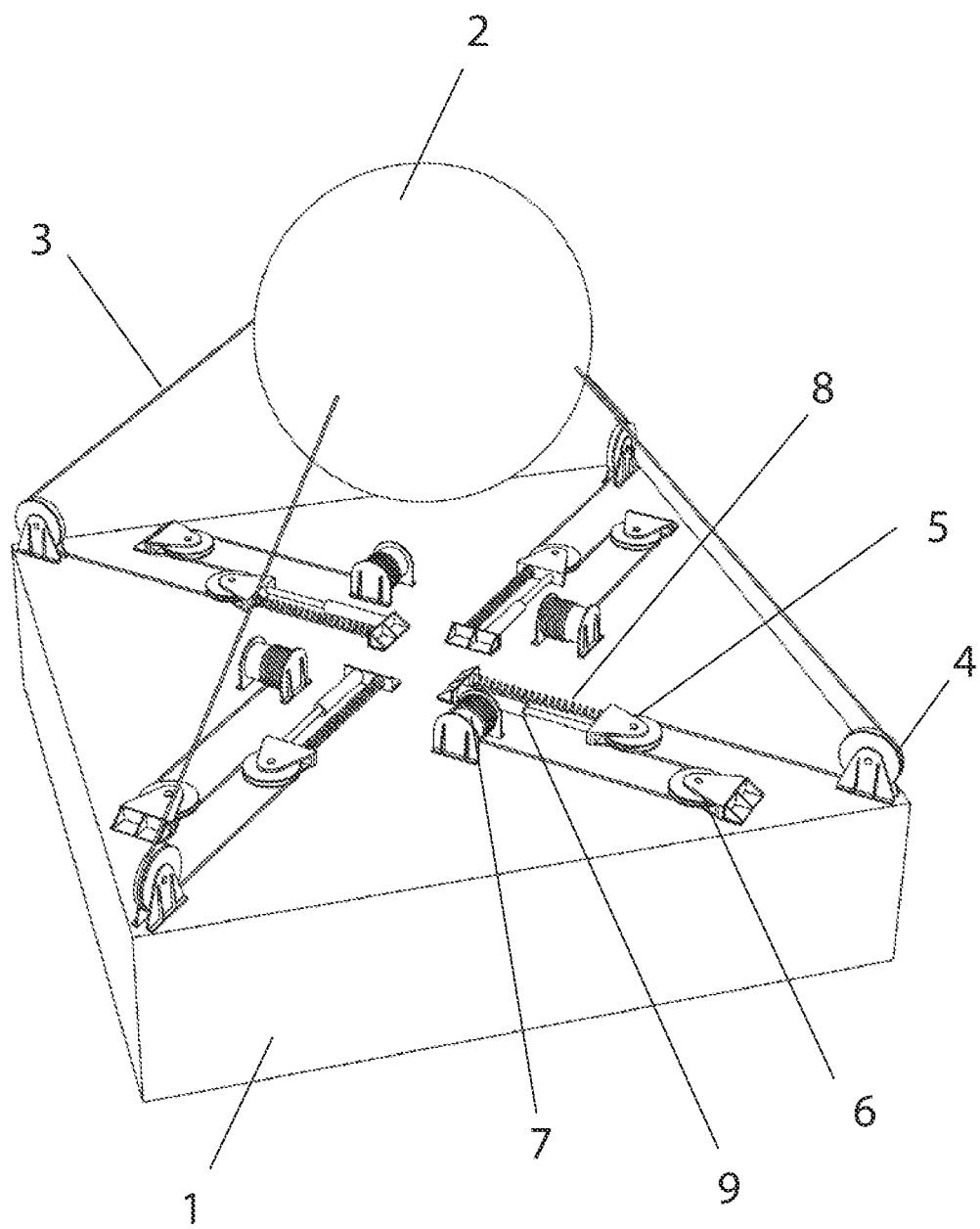
FIG. 1 is a perspective view of a first embodiment of a drive assembly according to the invention affixed to a wave-powered generator.

With reference to FIG. 1, a drive assembly according to the invention is shown comprised within a wave-powered generator. The wave powered generator incorporating the first embodiment of a drive assembly of the invention, comprises a reaction member 1, forming a platform for the drive assembly, and an energy capturing member 2 taking the form of a float. The reaction member 1, in this embodiment, also provides a platform for means for converting mechanical energy to electrical energy in the form of an energy converter 9. The actuating members 3, taking the form of flexible rope, define a distance between the energy capturing member 2, and energy transfer members 5, taking the form of movable pulleys. The energy transfer members 5 are coupled to energy storing members comprising a biasing member 8 taking the form of a spring, and further arranged to drive an energy converter 9. The actuating members 3 are in communication with a first fixed pulley 4 upstream of the energy transfer member 5, a second fixed pulley 6 downstream of the energy transfer member, and an adjustment member 7 taking the form of a winch. The adjustment member 7 is arranged to adjust the actuating length of the actuating members 3, the actuating length defining a distance between the energy capturing member 2 and the energy transfer member 5.

In the embodiment shown in FIG. 1, the reaction member 1 and the energy capturing member 2 each have a positive buoyancy, and are held submerged beneath the surface of a body of water. In alternate embodiments (not shown), the reaction member and the energy capturing member may have a positive, negative or neutral buoyancy configuration, or any combination thereof.

Figure 2:
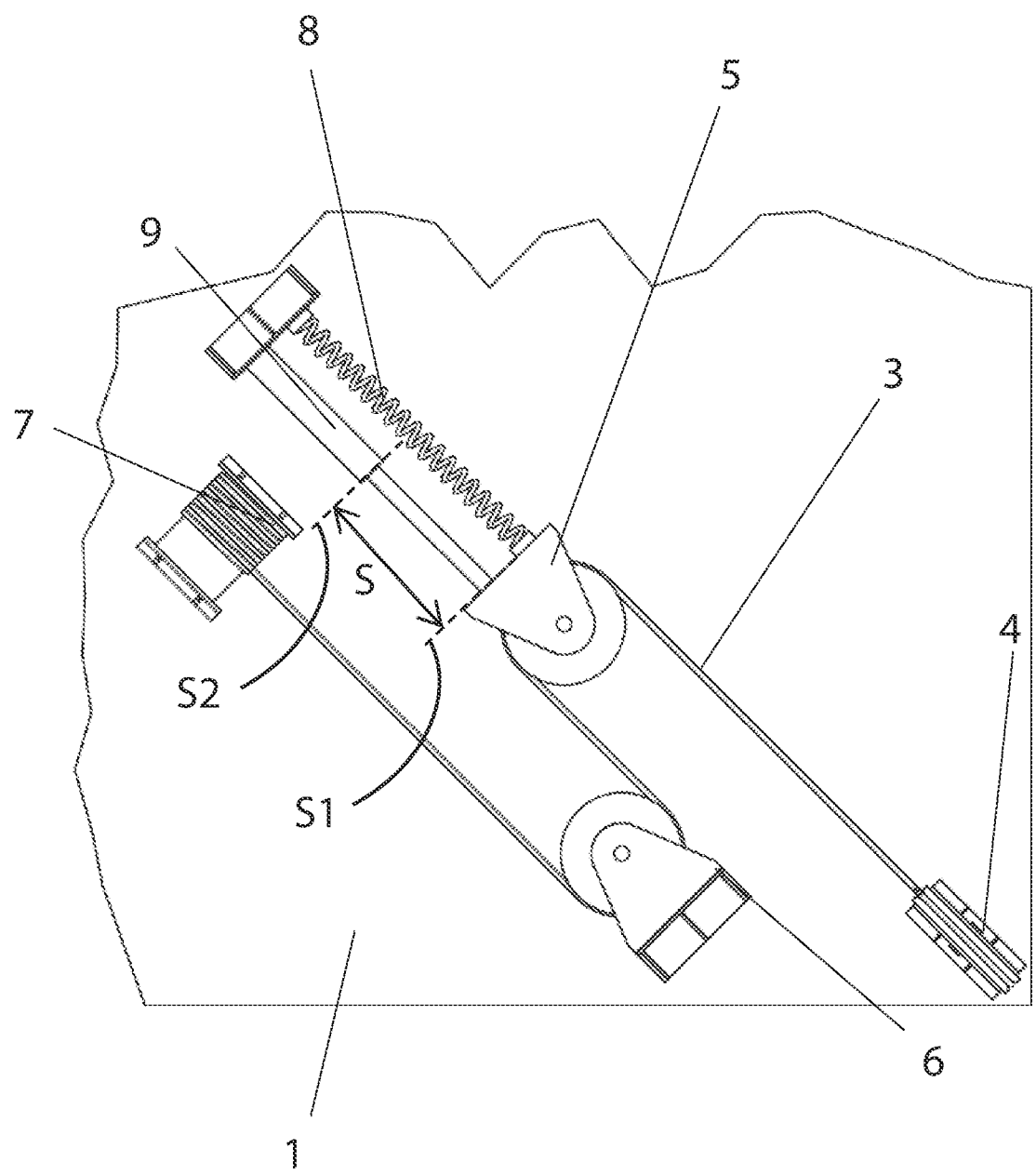
FIG. 2 is a plan view of the drive assembly of FIG. 1 affixed to a wave-powered generator (not shown), at minimum working stroke length.
Figure 3:
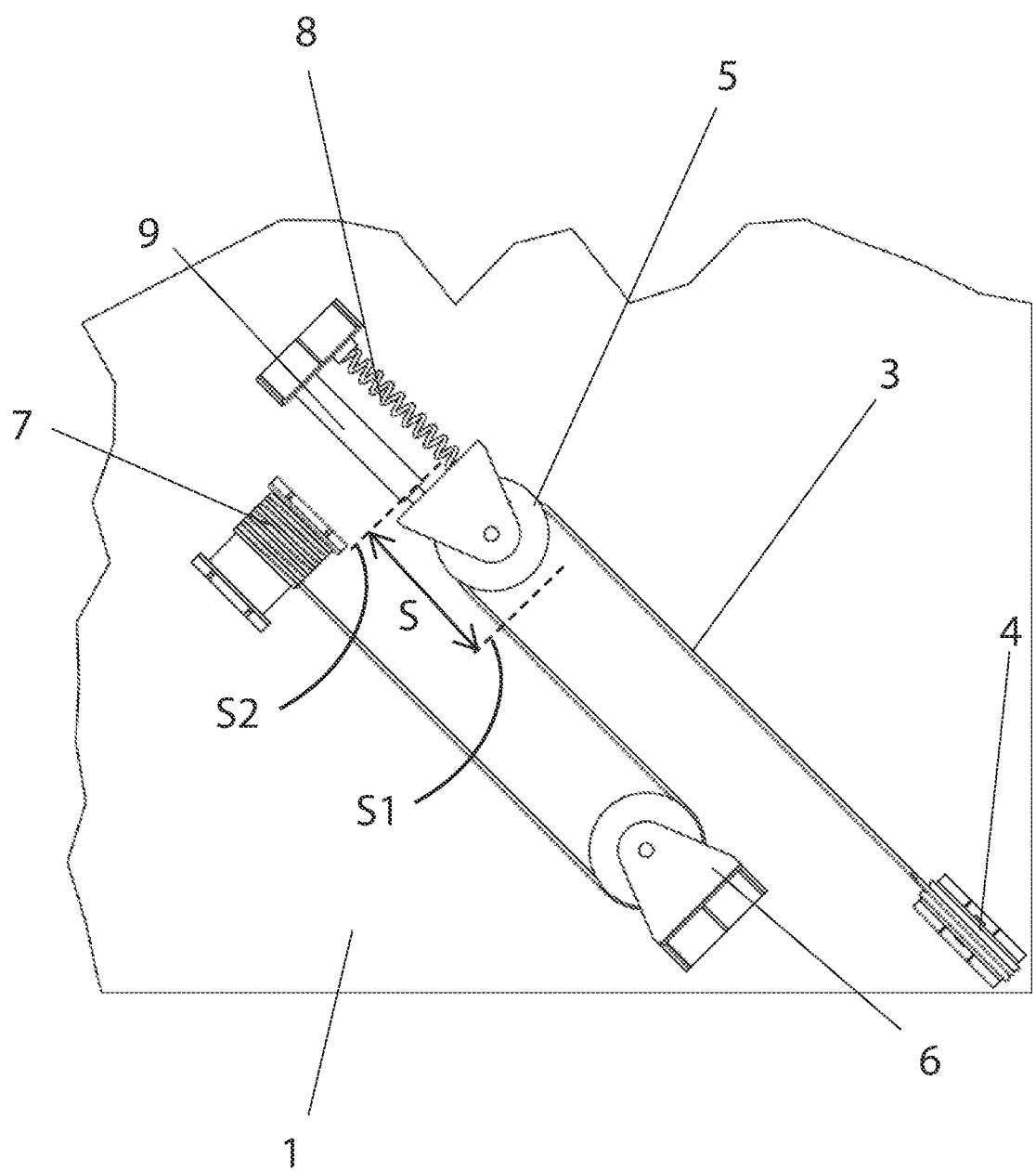
FIG. 3 is a plan view of the drive assembly of FIG. 1 and FIG. 2 affixed to a wave-powered generator (not shown), at maximum working stroke length.

FIG. 2 and FIG. 3 show plan views of the drive assembly of FIG. 1, comprising a first stroke position S1 and a second stroke position S2, defining distal end points of a working stroke S. The energy transfer member 5 is arranged to move from the first stroke position S1 to the second stroke position S2 according to the movement of the actuating member 3 as a result of movement of the energy capturing member 2. The movement of the energy transfer member 5 from the first stroke position S1 to the second stroke position S2 constitutes a working stroke S used to drive the energy converter 9. The biasing member 8 acts to bias the energy transfer member 5 toward the first stroke position S1 from the second stroke position S2 and this reciprocal movement may be used to further drive the energy converter 9. Reciprocal orthogonal movement of the energy transfer member 5 along an axis in this manner is used to drive the energy converter 9.

When the wave powered generator is deployed but no waves are acting on the energy capturing member 2 the biasing member 8 will be partially extended by the buoyancy force from the energy capturing member 2 positioning the energy transfer member 5 in a middle, or neutral, position in the working stroke S.

In use, as waves pass over the submerged wave-powered generator and move the energy capturing member 2, the changing distance between the energy capturing member 2 and the reaction member 1 is taken up by the working stroke S of the drive assembly. The working stroke S is shown in detail in FIG. 2 and FIG. 3, with the embodiment in FIG. 2 demonstrating the energy transfer member 5 at the first stroke position S1, and the embodiment in FIG. 3 demonstrating the energy transfer member 5 at the second stroke position S2.

Energy is temporarily (on a wave by wave basis) stored by the energy storing member comprising the biasing member 8 and excess energy is converted to a more useful energy by the energy converter 9. The energy converter 9 could be a variety of devices that convert energy and exert a damping force on the system, examples being a hydraulic pump or a linear generator. Alternatively the drive assembly according to the invention could be adapted to turn a rotational generator.

The overall distance between the energy capturing member 2 and the reaction member 1 is adjusted by adjusting the actuating length of the actuating members 3 by winding the actuating member onto or off the adjustment member 7. Each of the actuating members 3 may be wound onto the respective adjustment members 7 independently, and therefore the respective actuating lengths of the actuating members 3 may be altered independently according to the movement of the energy capturing member 2 in the water. In energetic sea states, the movement of the energy capturing member 2 is expected to be more frequent and more pronounced. The independent adjustability of the actuating members 3 accommodates for such variable movement of the energy capturing member 2.

The combination of a mechanism that provides a working stroke S, and an independent mechanism to adjust the actuating length of each of the actuating members 3, allows for the changing of the distance between the energy capturing member 2 and the energy transfer member 5, and simultaneous energy conversion to provide useful energy.

Figure 4:
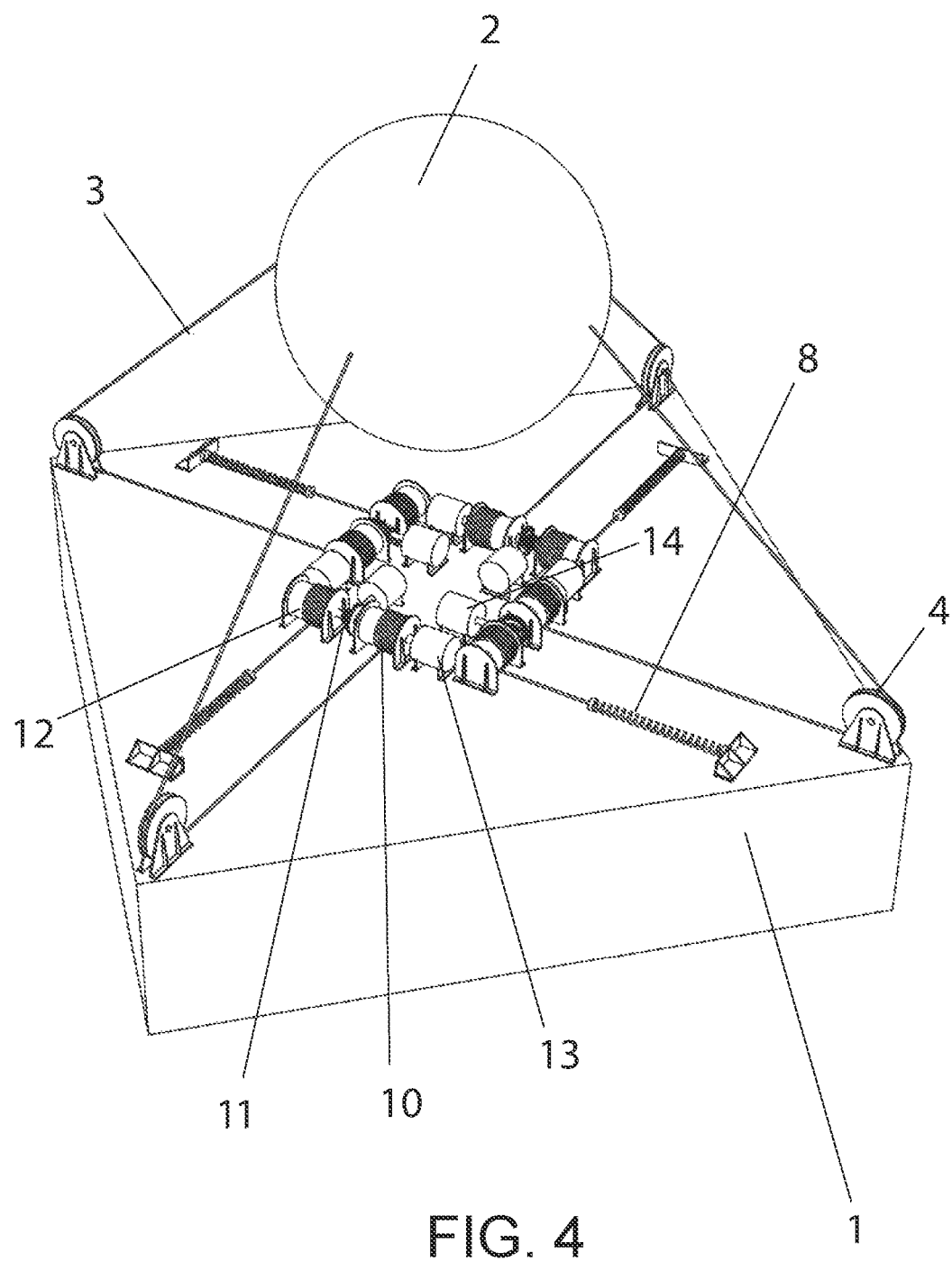
FIG. 4 is a perspective view of a second embodiment of a drive assembly according to the invention affixed to a wave-powered generator.
Figure 5:
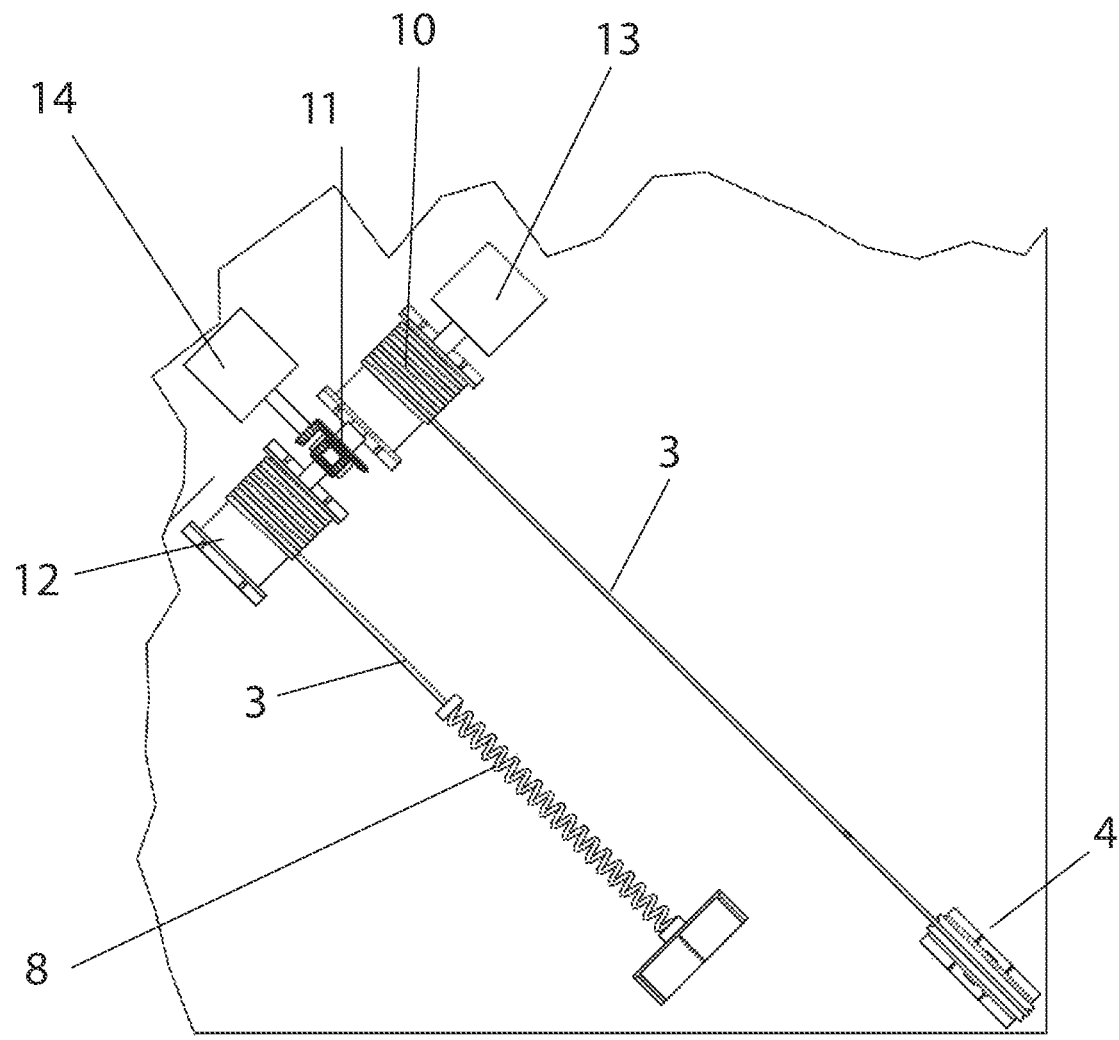
FIG. 5 is a plan view of the drive assembly of FIG. 4 affixed to a wave-powered generator (not shown)
Figure 6:
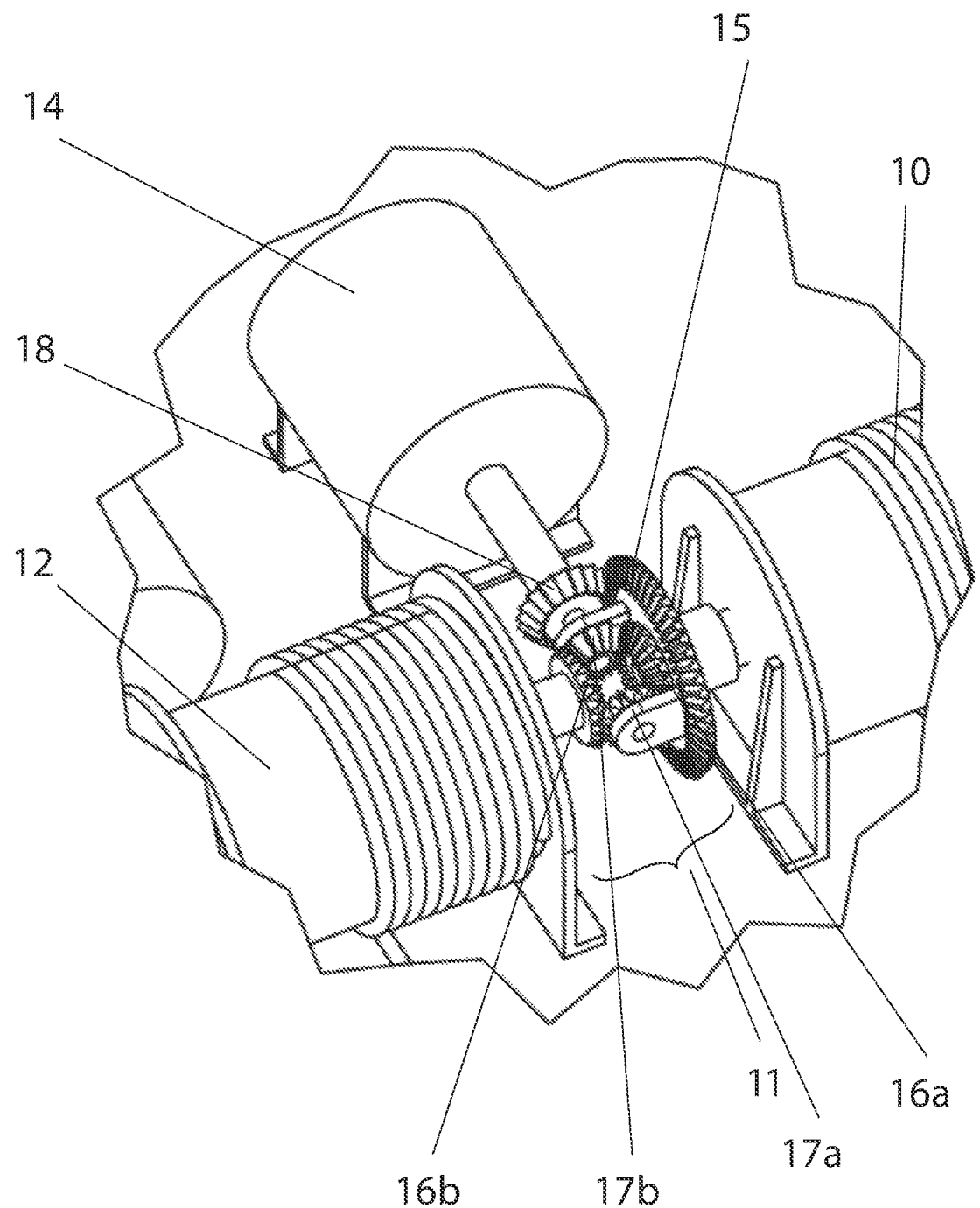
FIG. 6 is a close-up view of the energy transfer member of the drive assembly of FIG. 4 and FIG. 5.

In a second embodiment of the invention, shown in FIG. 4 to FIG. 6, the actuating length of the actuating members 3 define a distance between the energy capturing member 2 and energy transfer members, this time taking the form of first drum 10, a differential gear 11, and a second drum 12. In the embodiment shown in FIG. 4 to FIG. 6, the energy storing member comprising a biasing member 8 is arranged to cause the actuating member 3 to move position.

The first drum 10 is coupled to an energy converter 13, taking the form of a rotational electrical generator which removes excess energy from the system and converts the wave energy to a more useful energy. Both the first drum 10 and the second drum 12 comprise capacity for storage of the actuating member 3 that can at least accommodate the working stroke S of the system. In the embodiment of FIG. 4, throughout the wave cycle, the energy capturing member 2 moves in the water, causing a portion of the actuating members 3 to be spooled on and off the respective first and second drums 10, 12.

As with the previous embodiment, in the embodiment of FIG. 4 the force needed to extend the spring biasing member 8 to a middle position in the working stroke S is equal to the buoyancy force from the energy capturing member 2. Therefore, the drive assembly will always tend to automatically centralise the working stroke around this middle stroke position based on the fundamental force balance in the overall system.

In the embodiment of FIG. 4 adjustment of the length of the actuating member is achieved by causing or permitting different amounts of rotation between the first drum 10 and the second drum 12. Because the position of the second drum 12 will always tend towards the middle stroke position due to the fundamental force balance in the overall system, any differential rotation between the first drum 10 and the second drum 12 will ultimately result in a change to the rotational position of the second drum 12. Consequently more or less of the actuating member 3 will be spooled onto the first drum 10, and the distance between the energy capturing member 2 and the reaction member 1 will be adjusted. The first drum 10 therefore comprises sufficient additional storage capacity to accommodate the length of actuating member 3 needed to provide the desired range of adjustment in distance between the energy capturing member 2 and the reaction member 1 (as well as the working stroke S).

In the embodiment of FIG. 4 the preferred method of providing differential rates of rotation between the first drum 10 and the second drum 12 is by coupling the first drum 10 and the second drum 12 with a differential gear 11. Therefore, the combination of storage for the actuating member 3 on the first drum 10, and the ability to rotate the first drum at a different rate to the driver of the spring biasing member 8 (the second drum 12) provides an adjustment member in the drive assembly that can change the length of the actuating member 3 as required. Furthermore this arrangement allows the adjustment of the length of the actuating member 3 to be carried out in either direction and simultaneously to the normal operation of the drive assembly (i.e. without interruption to energy generation).

An example of a differential gear 11 suitable for use in the present invention is shown in detail in FIG. 6. The differential gear of the embodiment of FIG. 4 to FIG. 6 comprises a first sun gear 16a (coupled to the first drum), and a second sun gear 16b (coupled to the second drum), each coupled to a first and second planet gear 17a, 17b respectively. The differential gear 11 of the embodiment shown in FIG. 4 to FIG. 6 further comprises a ring gear 15 and a drive gear 18 arranged to be driven by a motor 14. The motor 14 is enabled to drive or lock the ring gear 15 of the differential 11 by movement of the drive gear 18. In normal operation the motor 14 is locked and the ring gear 15 is unable to turn and therefore the first sun gear 16a (coupled to the first drum 10) and the second sun gear 16b (coupled to the second drum 12) revolve by the same amount, but in opposite directions due to the rotation of the planetary gears 17a and 17b. The rotation of the first sun gear 16a (couple to the first drum) causes second sun gear 16b (coupled to the second drum) to rotate in the opposite direction, causing spooling of the actuating member onto or off the second drum 12 depending on which way the actuating member is fed onto the second drum 12. The spooling of the actuating member off the first drum 10, and consequently onto the second drum 12 due to the action of the differential gear 11 causes the movement of the energy transfer means from a first stroke position to a second stroke position used to drive the energy converter 13. The biasing member 8 is arranged to move the spooling of the actuating member 3 off the second drum 12 and off the first drum 10 and thus acts to bias the energy transfer member, comprising the first drum 10, the differential gear 11, and the second drum 12, from the second stroke position to the first stroke position. In this embodiment, the movement of the energy transfer member occurs through rotation about an axis.

When the motor 14 is activated, it turns the drive gear 18, which consequently turns the ring gear 15 leading to differential rotation of the first and second drums 10, 12. This has the effect (again due to the motional constraints in the system) of spooling an additional portion of the actuating member 3 either onto or off the first drum 10, thereby adjusting the actuating length of the actuating member 3 and hence the distance between the energy capturing member 2 and the energy transfer member. In this way the motor 14 acts as an adjustment member in the embodiment shown. The first drum 10 of the energy transfer member must therefore contain capacity for actuating member 3 storage, that includes both the working stroke and the desired capacity for distance adjustment between the energy capturing member 2 and the energy transfer member comprising the first drum 10, the differential gear 11 and the second drum 12.

The provision of a motor-driven or locked differential 11 between the first drum 10 and second drum 12 means that the actuating length of the actuating member 3 can be adjusted independently of the working stroke, and allows simultaneous energy production and changing of the distance between the energy capturing member 2 and the energy transfer member 5.

Understanding of the invention may be further provided by the following description.

In a second embodiment of the invention, shown in FIG. 4 to FIG. 6, the actuating length of the actuating member, taking the form of a rope 3 defines a distance between the energy capturing member, taking the form of a float 2, and energy transfer member, this time taking the form of first drum 10 that is coupled to an energy converter, taking the form of a rotational electrical generator 13 which removes excess energy from the system and converts the wave energy to a more useful form of energy.

The first drum 10 is coupled to a spring 8 which rotationally biases the first drum in one direction, preferably it biases the first drum in the direction that shortens the rope 3. In the embodiment shown in FIG. 4 to FIG. 6, the coupling of the spring 8 to the first drum 10 is achieved by another rope that is spooled onto a second drum 12 that can at least accommodate the working stroke S, of the drive assembly. It can be appreciated that the spring 8 could be rotationally coupled to the first drum 10 by alternative means, for example by a rotating lever.

The first drum 10 comprises capacity for storage of the rope 3 that can at least accommodate the working stroke S, of the system. Therefore, when the drive assembly of FIG. 4 is in use, throughout the wave cycle, the float 2 moves in the water, causing a portion of the rope 3 to be spooled on and off first drum 10, and simultaneously drive the coupled rotational generator 13, and coupled spring 8 (also by way of spooling the rope on and off the second drum 12).

As with the previous embodiment, in the embodiment of FIG. 4 the force needed to extend the spring 8 to a middle position in the working stroke S, is equal to the buoyancy force from the float 2. Therefore, the drive assembly will always tend to automatically centralise the working stroke around this middle stroke position based on the fundamental force balance in the overall system.

In the embodiment of FIG. 4 adjustment of the length of the rope is achieved by causing or permitting different amounts of rotation between the first drum 10 and the second drum 12. Because the position of the second drum 12 will always tend towards the middle stroke position due to the fundamental force balance in the overall system, any differential rotation between the first drum 10 and the second drum 12 will ultimately result in a change to the rotational position of the second drum 12. Consequently more or less of the rope 3 will be spooled onto the first drum 10, and the distance between the float 2 and the first drum 10 will be adjusted. The first drum 10 therefore comprises sufficient additional storage capacity to accommodate the length of rope 3 needed to provide the desired range of adjustment in distance between the float 2 and the first drum 10 (as well as the working stroke S).

In the embodiment of FIG. 4 the preferred method of providing differential rates of rotation between the first drum 10 and the second drum 12 is by coupling the first drum 10 and the second drum 12 with a differential gear 11. Therefore, the combination of storage for the rope 3 on the first drum 10, and the ability to rotate the first drum at a different rate to the driver of the spring 8 (the second drum 12) provides an adjustment means in the drive assembly that can change the length of the rope 3 as required. Furthermore this arrangement allows the adjustment of the length of the rope 3 to be carried out in either direction and simultaneously to the normal operation of the drive assembly (i.e. without interruption to energy generation). An example of a differential gear 11 suitable for use in the present invention is shown in detail in FIG. 6. The differential gear of the embodiment of FIG. 4 to FIG. 6 comprises a first sun gear 16*a* (coupled to the first drum), and a second sun gear 16*b* (coupled to the second drum), each coupled to a first and second planet gear 17*a*, 17*b* respectively. The differential gear 11 further comprises a ring gear 15 and a drive gear 18 arranged to be driven by a motor 14. The motor 14 is enabled to drive or lock the ring gear 15 of the differential 11 by movement of the drive gear 18. In normal operation the motor 14 is locked and the ring gear 15 is unable to turn and therefore the first sun gear 16*a* (coupled to the first drum 10) and the second sun gear 16*b* (coupled to the second drum 12) revolve by the same amount, but in opposite directions due to the rotation of the planetary gears 17*a* and 17*b*. The rotation of the first sun gear 16*a* (coupled to the first drum) causes second sun gear 16*b* (coupled to the second drum) to rotate in the opposite direction, causing spooling of rope onto or off the second drum 12 depending on which way the rope is fed onto the second drum 12. When the motor 14 is activated, it turns the drive gear 18, which consequently turns the ring gear 15 leading to differential rotation of the first and second drums 10, 12.

Figure 7:
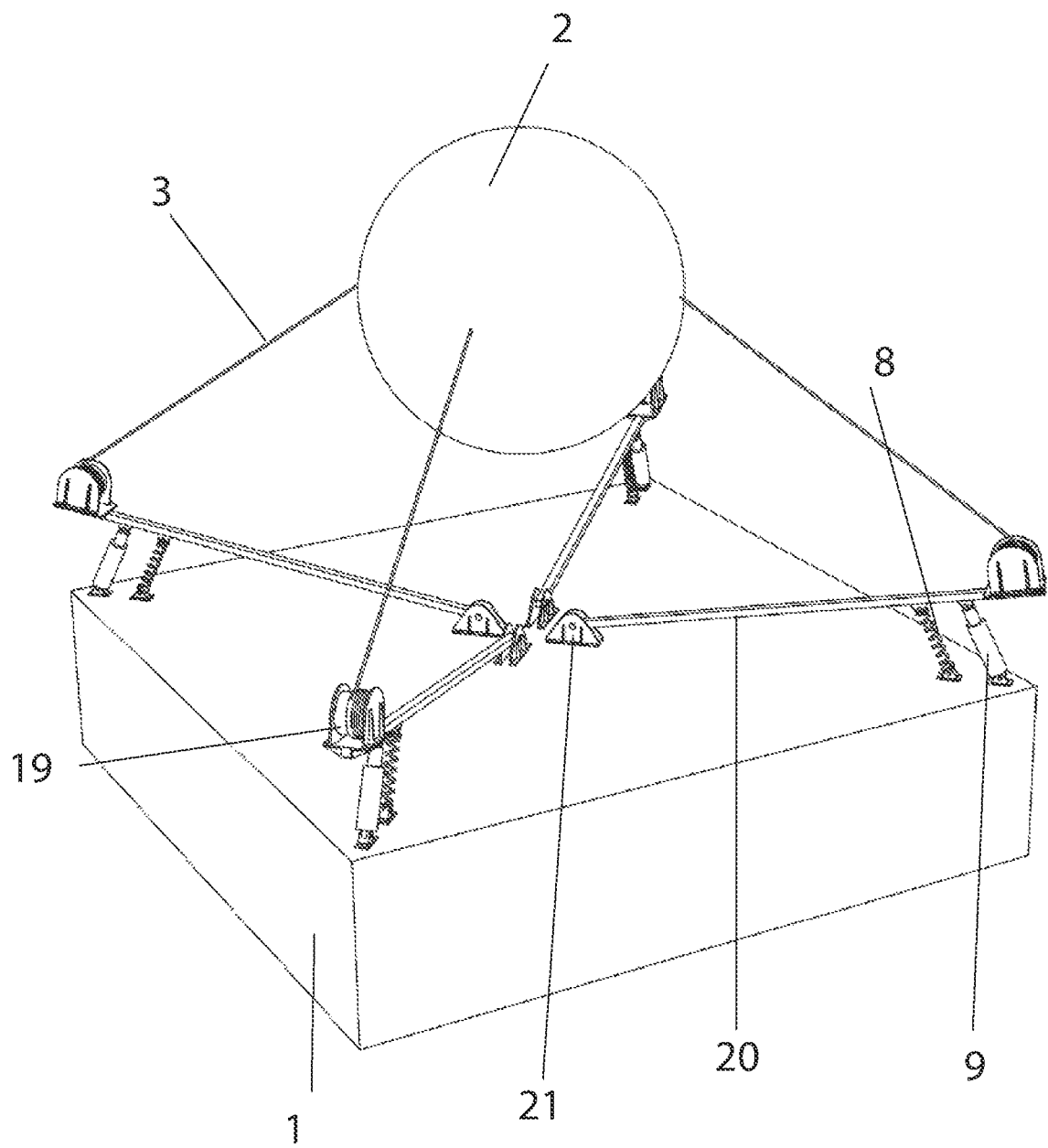
FIG. 7 is a perspective view of a third embodiment of a drive assembly according to the invention affixed to a wave-powered generator.

FIG. 7 shows a third embodiment of the present invention, in which the energy transfer members comprise a lever arm 20, and wherein the actuating members 3 define a distance between the energy capturing member 2 and the energy transfer members via an adjustment member 19 taking the form of a winch that is placed on the lever arm 20 of the energy transfer member. The lever arm 20 of the energy transfer member is, at one end, coupled to a reaction member 1 at a hinged joint 21.

At the end of the lever arm 20, distal to the hinged joint and proximate the actuating member 3, there is positioned an energy storing member comprising a biasing member 8, which in the embodiment shown is anchored to the reaction member 1. At the same end of the lever arm 20 as the biasing member 8, there is connected an energy converter 9, which allows excess energy to be captured and converted to a more useful form of energy (the energy converter 9 can take the form of a multitude of energy converters as previously described).

A working stroke to accommodate movement of the energy capturing member 2 caused by the waves is provided by the hinging of the lever arm 20. The distance between the energy capturing member 2 and the energy transfer member 5 can be adjusted by the respective adjustment member 19 independently and simultaneously.

It will be appreciated that the above described embodiments are given by way of example only and that various modifications thereto may be made without departing from the scope of the invention as defined in the appended claims. For example, the above-described embodiments refer specifically to wave-energy, but embodiments will be conceivable wherein the present invention is used to harness and convert wind power, or alternatively hydroelectric power, which may be in combination with a weir or dam.

The invention claimed is:

1. An assembly arranged to transfer wave energy to a plurality of hydraulic pistons, the assembly comprising:
   a platform;
   a float;
   a plurality of flexible lines, each line defining an actuating portion comprising a segment of the line, the actuating portion of each line extending between the float and the platform;
   a plurality of pulleys, each of the plurality of pulleys being in engagement with an associated one of the plurality of flexible lines and movable by the associated line between a first position and a second position, where each pulley is coupled to an associated one of the plurality of hydraulic pistons and is arranged to transfer energy from the associated line to the associated hydraulic piston;
   a plurality of springs, each spring extending between the platform and an associated one of the plurality of pulleys in a coterminal and coplanar relationship with the associated one of the plurality of hydraulic pistons, the spring biasing the associated one of the plurality of pulleys toward the first position; and
   a plurality of winches, each winch engaged with a corresponding one of the lines and configured to adjust a length of the actuating portion of the corresponding line;

wherein movement of each pulley of the plurality of pulleys from the first position to the second position and back to the first position defines a working stroke of each of the plurality of pulleys and drives the associated one of the plurality of hydraulic pistons;

wherein movement of each pulley of the plurality of pulleys by the associated line comprises rotation of the pulley about respective pulley axis; and wherein each winch of the plurality of winches is configured such that the actuating portion of the corresponding line is adjustable by the winch during movement of the associated pulley along the corresponding working stroke of the associated pulley.

2. The assembly of claim 1, wherein each of the plurality of flexible lines comprises a flexible rope.

3. The assembly of claim 2, wherein the actuating portion of each of the plurality of flexible lines extends between the float and a corresponding one of the plurality of pulleys.

4. The assembly of claim 3, wherein the actuating portion of each of the plurality of flexible lines is adjustable by the corresponding winch during movement of the corresponding one of the plurality of pulleys along the working stroke.

5. The assembly of claim 4, wherein each respective winch is configured such that the actuating portion of each of the plurality of flexible lines is adjustable by the respective winch during movement of each of the plurality of pulleys along the corresponding working strokes of the pulleys.

6. The assembly of claim 5, wherein the plurality of flexible lines comprises at least a first line, a second line, and a third line, each of the first, second, and third lines defining an actuating portion thereof extending between the float and the platform.

7. The assembly of claim 5, wherein each winch of the plurality of winches is configured to store a portion of the corresponding one of the plurality of flexible lines.

8. The assembly of claim 7, wherein each of the plurality of pulleys comprises a rotating portion arranged to rotate about an axis as a result of actuation by a corresponding one of the plurality of flexible lines.

9. The assembly of claim 8, wherein each of the plurality of pulleys is mounted for linear translation and configured to move in a reciprocating motion along the platform as a result of said actuation by said corresponding one of the plurality of flexible lines.

* * * * *